United States Patent [19]
Fujii et al.

[11] Patent Number: 6,081,608
[45] Date of Patent: Jun. 27, 2000

[54] PRINTING QUALITY EXAMINING METHOD

[75] Inventors: Tomohiro Fujii; Norifumi Tasaka; Rieko Kitahara, all of Mihara, Japan

[73] Assignee: Mitsubishi Jukogyo Kabushiki Kaisha, Japan

[21] Appl. No.: 09/045,099

[22] Filed: Mar. 20, 1998

Related U.S. Application Data

[63] Continuation-in-part of application No. 08/595,994, Feb. 6, 1996, abandoned.

[30] Foreign Application Priority Data

Feb. 9, 1995 [JP] Japan ................................. 7-021531
Feb. 9, 1995 [JP] Japan ................................. 7-021532
Feb. 9, 1995 [JP] Japan ................................. 7-021533
Feb. 9, 1995 [JP] Japan ................................. 7-021534

[51] Int. Cl.$^7$ ...................................................... G06K 9/78
[52] U.S. Cl. .......................... 382/112; 348/92; 250/559.05
[58] Field of Search .................................. 382/112, 309, 382/141; 358/504, 406; 348/129, 130, 88, 92; 356/430; 250/559.04, 559.05, 559.07, 559.08

[56] References Cited

U.S. PATENT DOCUMENTS

| | | | |
|---|---|---|---|
| 4,311,914 | 1/1982 | Huber | 382/112 |
| 4,561,103 | 12/1985 | Horiguchi et al. | 382/112 |
| 4,744,035 | 5/1988 | Hashim | 348/129 |
| 5,235,652 | 8/1993 | Nally | 382/112 |
| 5,255,329 | 10/1993 | Tanimizu et al. | 382/112 |
| 5,555,313 | 9/1996 | Zheng et al. | 382/112 |
| 5,625,703 | 4/1997 | Okuda et al. | 382/112 |

OTHER PUBLICATIONS 4.13.3 Principal of Detection, Y Studio Sunpro, ISBN4–924728–02–0 C3058, 1986–1987, pp. 303–310 (with English language translation of pertinent section).

*Primary Examiner*—Jon Chang
*Attorney, Agent, or Firm*—Trop, Pruner & Hu, P.C.

[57] ABSTRACT

A printing quality examining method in which image data printing paper is successively taken in by a camera of a detection unit. The image data are compared with a previously taken-in reference data to detect a printing defect so that a decision as to whether printing quality is good or bad is made. The image data is averaged in time to calculate an estimated data, and the estimated data is compared with the previously taken-in reference data. When the estimated data is normal, pixels are determined to be normal. When the estimated data is unusual, the image data from the detection unit is compared with the reference data at next step so that when the image data from the detection is normal, the pixels are determined to be normal and when the image data is unusual, the pixels are determined to be defective and the paper is discharged.

2 Claims, 17 Drawing Sheets

FIG. 6
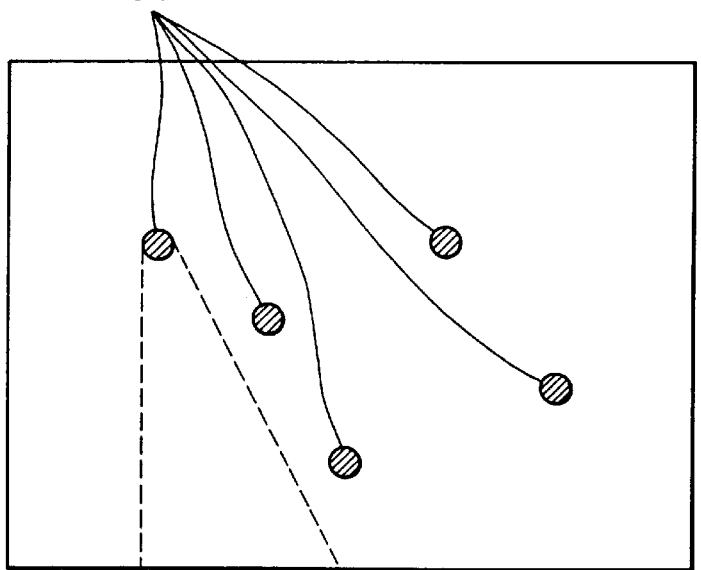
37 AREA IN WHICH NOTICEABLE PIXEL EXISTS
36 PRINTED IMAGE DATA
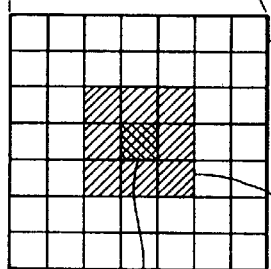
37 ENLARGED VIEW OF AREA IN WHICH NOTICEABLE PIXEL EXISTS
38 PERIPHERAL PIXELS (HATCHED PORTION)
35 NOTICEABLE PIXEL (CROSSHATCHED PORTION)

PRINTING QUALITY EXAMINING METHOD

CROSS REFERENCE TO RELATED APPLICATIONS

This is a continuation-in-part application of application Ser. No. 08/595,994, filed Feb. 6, 1996 now abandoned.

BACKGROUND OF THE INVENTION

The present invention relates to a printing quality examining apparatus (an apparatus for examining printing quality) used for decision as to whether printing quality is good or bad.

In a conventional printing quality examination method, as shown in FIG. 10, image data of printing paper are successively read in order of k=1, . . . , k=n−1, k=n by means of a camera and the image data are averaged in time to obtain estimated value data. In FIG. 10, i, j and k are marks for defining coordinates for picture or pattern data on paper. The estimated value data is compared with a previously read reference data and when a difference therebetween exceeds a threshold value, pixels thereof are decided to be defective. A flow chart of this decision operation is shown in FIG. 11.

In the conventional printing quality examination method shown in FIGS. 10 and 11, however, an estimated value data which is an average value of image data on current printing paper and image data on past printing paper is compared with the reference data in order to improve detection accuracy. Accordingly, once any defect occurs, estimated value data of normal pixels on several printing papers used subsequently to the occurrence of the defect are influenced by defective data in the past, so that the normal pixels are decided as defective pixels in error and consequently even satisfactory paper is discharged as defective paper.

Further, FIG. 12 illustrates a printing quality examination apparatus used heretofore. This conventional printing quality examination apparatus is now described with reference to FIG. 12. In FIG. 12, numeral 105 denotes a printing paper put on an impression cylinder A so that the printing paper is curved arcuatedly, numeral 114 a camera disposed in a detection unit, numeral 115 a xenon lamp disposed far from the detection unit, numeral 116 an optical fiber extended from the xenon lamp 115, numeral 117 a light irradiating end formed at an end of the optical fiber 116, and numeral 118 an optical axis of the light source. The camera 114 is disposed so that an optical axis of the camera is substantially vertical to the printing paper 105 and the light irradiating end 117 is disposed so that an optical axis of the light irradiating end 117 is oblique to the printing paper 105.

The printing paper 105 is irradiated by light from the light irradiating end 117, while image data on the printing paper 105 is taken in by the camera 114 and defective paper is detected from the image data on the printing paper 105.

However, in the illumination apparatus of the conventional printing quality examination apparatus shown in FIG. 12, the printing paper 5 is illuminated by illumination light from the single light irradiating end 117 and accordingly the xenon lamp 115 having the high luminous intensity is required. Furthermore, since the xenon lamp 115 is disposed far from the detection unit and light from the xenon lamp is led to the detection unit through the optical fiber 116, a manufacturing cost thereof is increased.

Further, a condensing lens or the like is used to feed the illumination light from the xenon lamp 115 to the optical fiber 116 effectively. The condensing lens or the like must be maintained for the optical deterioration and a great deal of labor is required therefor.

In addition, at a held end of the printing paper 105 on the impression cylinder A, when image data is taken in by the detection unit, an amount of light incident on the detection unit is varied due to fluttering of the paper, so that amendment of the illumination light amount is influenced greatly. More concrete description is given as follows.

When normal printing paper is irradiated by illumination light vertically and an illuminometer 119 is moved in parallel to the printing paper to measure the luminous intensity on the paper while the illuminometer is maintained vertically and in an equal distance to the printing paper as shown in FIG. 13, the luminous intensity on the paper is expressed by a curve named a substantially normal distribution and the distribution of the luminous intensity is maximized in the vicinity of the optical axis 120 of the illumination.

In the illumination apparatus of the conventional printing quality examination apparatus, as shown in FIG. 14, illumination light is incident along an incident axis 121 oblique to the vertical axis and passing through an incident point of illumination light and the light is reflected along an emitting axis 122 having the same angle in the opposite direction. Accordingly, the maximum point of the luminous intensity on the paper is offset on the side of the reflected light with respect to the vertical axis as shown by a curve of FIG. 14.

FIG. 15 illustrates variation in the luminous intensity on the printing paper 105 due to a fluttering of paper occurring at the held end of the printing paper 105 on the impression cylinder A.

When fluttering of paper does not occur at the held end of the printing paper 105, the distribution of the luminous intensity shown by solid line is obtained and the luminous intensity on the paper on the optical axis of the camera 114 is $I_0$. The case where the held end of the paper is moved up is now considered. An amount of variation or movement is regarded to be able to be neglected as compared with a distance from the light irradiating end 117 and the camera 114 to the printing paper 105 and the printing paper 105 is assumed to be angularly moved or rotated about an intersection point O of the printing paper and the vertical line drawn from the camera 114 to the printing paper. The upward movement of the held end of the paper corresponds to the angular movement of the printing paper 105 in the counterclockwise direction by an angle $\alpha$.

At this time, the normal line extending from the intersecting point 0 vertically to the printing paper 105 is rotated by $\alpha$ in the counterclockwise direction similarly. Further, the emitting axis of the reflected light is rotated by $2\alpha$ and the maximum point of the luminous intensity in the distribution of the luminous intensity on the printing paper 105 is also moved leftward as shown by broken line in FIG. 15. Thus, an amount of light received by the camera 114 is varied from $I_0$ to $I_1$. This corresponds to a variation in the amount of light received by the camera 114 due to fluttering of paper.

Further, FIG. 16 schematically illustrates a circuit configuration of a conventional printing quality examination apparatus. In this case, an image of a printing paper having the luminous intensity on the surface thereof maintained constant by illumination light from an illuminating light source is taken in by a line camera of a detection unit 201. The luminous intensity on the printing paper is maintained to be constant and decision as to whether the printing paper is good or bad is made as follows.

As shown in FIG. 17, an output signal from the detection unit 201 is reduced in substantially inverse proportion to a machine speed. The output signal from the detection unit 201 is supplied to an amplifier 202 of FIG. 16 to be amplified and the amplified signal is supplied to an analog-to-digital (A/D) converter 203 to be converted to a digital signal. Thereafter, the digital signal is subjected to a correction process with respect to the machine speed and is held to be a fixed signal level as shown in FIG. 17. Then, the digital signal is supplied to a comparison operation circuit 204 of FIG. 16 to be compared with a previously taken-in reference image data. This operation result is supplied to a decision circuit 205 in which decision as to whether the printing paper is good or bad is made.

The decision result is supplied to the control and display unit 206 in which unsatisfactory paper is discharged and an alarm to an operator is displayed.

However, the printing quality examination apparatus shown in FIGS. 16 and 17 has the following problems.

The luminous intensity on the printing paper is maintained to be constant by illumination light from the illumination light source and since an amount of light received by the printing paper is reduced when the machine speed is increased, a gain is applied to the whole signal in order to maintain the received light amount constant. Accordingly, there are the following problems.

(1) Since a gain is applied to the whole signal, even noise is amplified.
(2) Variation of the received light amount depending on quality of paper cannot be understood.
(3) Since an amount of light is reduced due to a life of the illumination light source, it is necessary to maintain the illumination light source.

Further, in the conventional printing quality examination apparatus, as shown in FIG. 18, an image data of a blank portion 311 of the printing paper is taken in by the camera of the detection unit and brightness of this portion is compared with a previously set reference value of the luminous intensity. An amount of light of the illumination light source is corrected on the basis of the result thereof to thereby obtain the luminous intensity required in the detection unit.

However, in the conventional printing quality examination apparatus shown in FIG. 18, it is presupposed that the blank portion 311 for correction of the light amount is present in the printing paper. However, some printing papers have no blank portion and in this case, it is impossible to correct the light amount.

On the other hand, when the blank portion 311 necessary for the correction of the light amount exists in the vicinity of a picture portion 312 and the picture portion is moved or shifted due to mechanical vibration or the like, an amount of light in the printing portion other than the blank portion 311 is sometimes detected. When the light amount is corrected in such a state, there is a problem that a corrected light amount in the detection portion becomes instable.

SUMMARY OF THE INVENTION

The present invention has been made in view of the above various problems and objects thereof are as follows:

It is a first object of the present invention to provide a printing quality examining method capable of eliminating a defect that some satisfactory papers subsequent to defective paper are decided as defective papers.

Further, it is a second object of the present invention to provide an illumination apparatus of a printing quality examining apparatus capable of (1) improving defect detection accuracy of printing paper extremely, (2) reducing a manufacturing cost and reducing labors required to maintain optical parts.

In addition, it is a third object of the present invention to provide a printing quality examining apparatus capable of (1) improving defect detection accuracy of printing paper extremely, (2) detecting defect of printing paper with high stability, and (3) reducing labors required to maintain an illumination light source.

Furthermore, it is a fourth object of the present invention to provide a printing quality examining apparatus capable of (1) performing correction of an amount of light to even printing paper having no blank portion, (2) stabilizing a corrected light amount in a detection portion, and (3) reducing a cost of printing paper when the paper is expensive.

In order to achieve the first object, according to the present invention, in the printing quality examining method in which image data of a printing paper successively taken in by a camera of a detection unit is compared with a previously taken-in reference data to detect a printing defect and decide whether the printing quality is good or bad, the image data of the printing paper taken in by the camera of the detection unit is averaged in time to calculate estimated data and the estimated data is compared with previously taken-in reference data. When the estimated data is normal, pixels are decided to be normal and when the estimated data is unusual, the image data from the detection unit is compared with the reference data at the next step. When the image data from the detection unit is normal, the pixels are decided to be normal and when the image data is unusual, the pixels are decide to be defective and the paper is discharged.

In a preferred aspect of the present invention, the estimated data and the image data having characteristics complementary to each other are compared with the reference data and decision as to whether the printing quality is good or bad is made on the basis of the resultant logic product.

According to the present invention with the above structure, only the unusual printing paper is decided to be unusual and there is no case where some satisfactory papers subsequent to defective paper are decided to be defective notwithstanding satisfactory paper.

Further, in order to achieve the second object, according to the present invention, in the printing quality examination apparatus in which a detection unit including illumination light sources and a camera is disposed in opposite to an arcuatedly curved printing paper and a defective paper is detected from image data of the printing paper taken in by the detection unit, there is provided two illumination light sources and the two illumination light sources are disposed so that axes of illumination light from the two illumination light sources are symmetrically oblique to an optical axis of the camera and have equal angles with respect to the optical axis of the camera.

With the above structure, in the printing quality examining apparatus of the present invention, when the printing paper is rotated counterclockwise by $\alpha$, an emitting axis of one illumination light source is also rotated in the same direction by $2\alpha$. Accordingly, the maximum point of the distribution of luminous intensity on the paper by the one illumination light source is moved leftward and an amount of light on the optical axis of the camera is increased in the same manner as the prior art. However, the maximum point of the distribution of luminous intensity by the other illumination light source is also moved leftward to thereby reduce the amount of light on the optical axis of the camera. In this manner, since the light amounts of both the illumination light sources are increased and reduced relatively, the illumination apparatus always emits a fixed amount of light with respect to the camera even if the printing paper is varied due to fluttering of the held end thereof.

Furthermore, in order to achieve the third object, according to the present invention, in the printing quality examining apparatus including a line camera of a detection unit for taking in image data of printing paper, an illumination light source for illuminating the printing paper to ensure an amount of light required by the line camera, a camera controller for controlling the line camera, and an examination controller for comparing the image data obtained by the line camera with reference image data to decide whether the quality of the printing paper is good or bad, the printing quality examining apparatus comprises a light amount correction unit for varying an amount of light of the illumination light source in accordance with printing speed, paper quality, the light source and the like and holding a received light amount of the line camera to be constant, so that a signal level of the image data is corrected.

In a preferred aspect of the present invention, the light amount correcting unit comprises a light amount difference detection unit for comparing image data of a blank portion of the printing paper with a previously set target luminous intensity and a light amount difference correction circuit for obtaining a correction value for a difference of the luminous intensity from the light amount difference detection unit.

According to the present invention with the above structure, the blank portion of the printing paper is read by the line camera of the detection unit and an image data of the blank portion is supplied to the light amount correction unit in which the image data of the blank portion is compared with the previously set target luminous intensity to obtain the difference of light amount. A correction voltage for correcting a voltage value of a power supply for the light source is obtained while using the difference of light amount as a parameter. The power supply for the light source is controlled by the correction voltage to change the luminous intensity of the illumination light source, so that a signal having a fixed level is always obtained from the detection unit without relation to the machine speed. That is, when the machine speed is increased and a received light amount of the detection unit is reduced, the illumination light source is controlled so that the illumination light amount can be increased correspondingly to maintain the received light amount from the blank portion of the detection unit to be always constant.

In addition, in order to achieve the fourth object, according to the present invention, in the printing quality examining apparatus in which printing paper is illuminated by an illumination light source and image data of the printing paper is taken in by a camera of a detection unit to decide whether the printing quality is good or bad in accordance with the image data, the printing quality examining apparatus comprises a maximum light amount pixel detection circuit for selecting a plurality of maximum light amount pixels from image data taken in by the camera and determining and holding pixel positions thereof, a light amount averaging circuit for calculating an average value of the maximum light amount pixels, and a difference circuit for comparing the average value with a previously set reference value of light amount to calculate a difference thereof. Further, in the present invention, when the printing paper is illuminated by the illumination light source and the image data of the printing paper is taken in by the camera of the detection unit to decide whether the printing quality is good or bad on the basis of the image data, the plurality of maximum light amount pixels are selected from the taken-in image data by the maximum light amount pixel detection circuit and the pixel positions thereof are determined and held. The average value of the maximum light amount pixels is calculated by the light amount averaging circuit and the average value is compared with the previously set reference value of light amount by the difference circuit to calculate a difference thereof. A voltage variation is calculated while using the difference as a parameter and the light amount of the illumination light source is corrected in accordance with the voltage variation to obtain the optimum illumination condition by the detection unit.

BRIEF DESCRIPTION OF THE DRAWING

FIG. 6 is a diagram illustrating structure of image data in the printing quality examining apparatus according to the first embodiment of the present invention;

DESCRIPTION OF THE PREFERRED EMBODIMENTS

Referring now to FIGS. 1 to 9, first and second embodiments of the present invention are described in detail.

Figure 1:
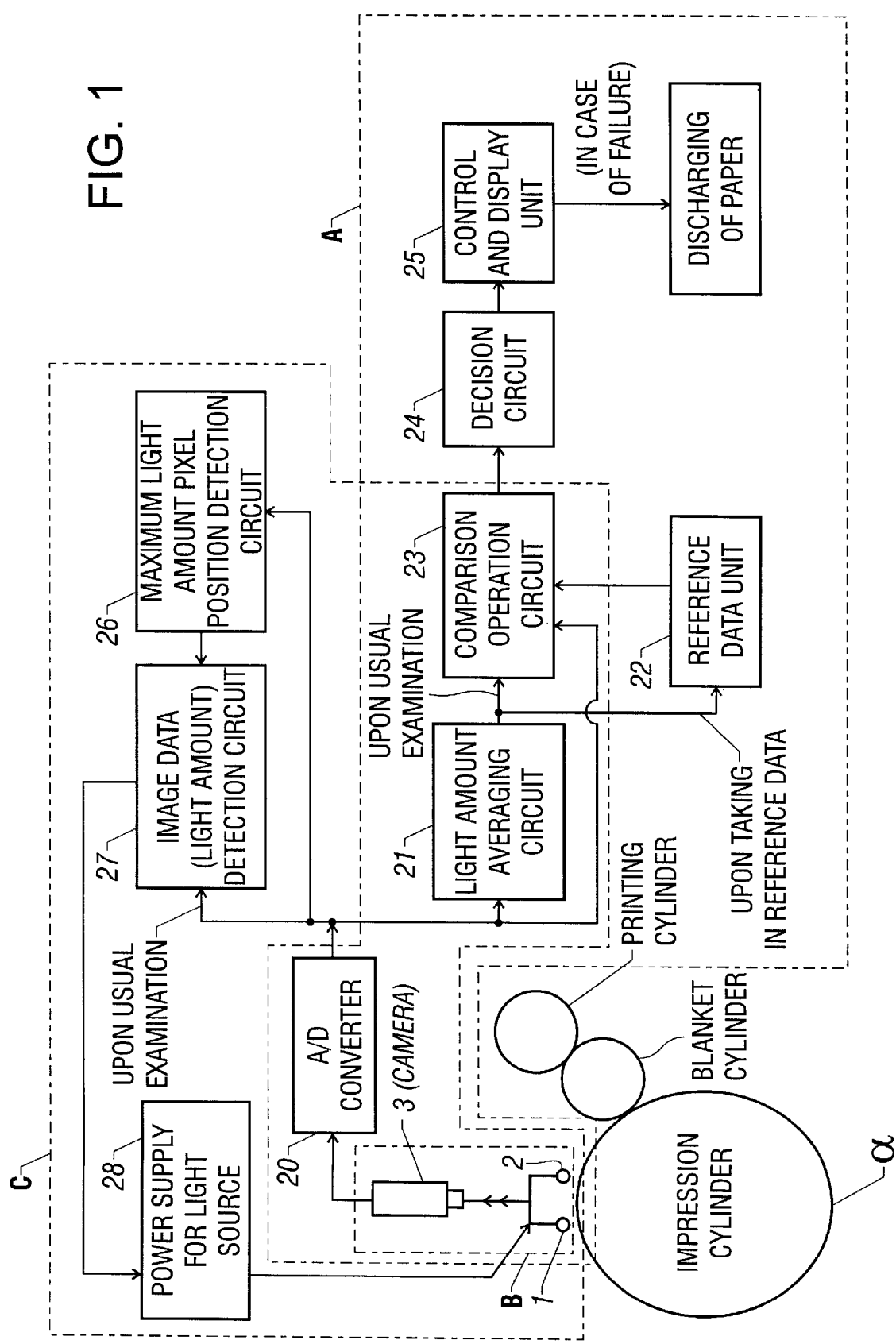
FIG. 1 is a block diagram schematically illuminating the whole configuration of a printing quality examining apparatus according to a first embodiment of the present invention.
Figure 2:
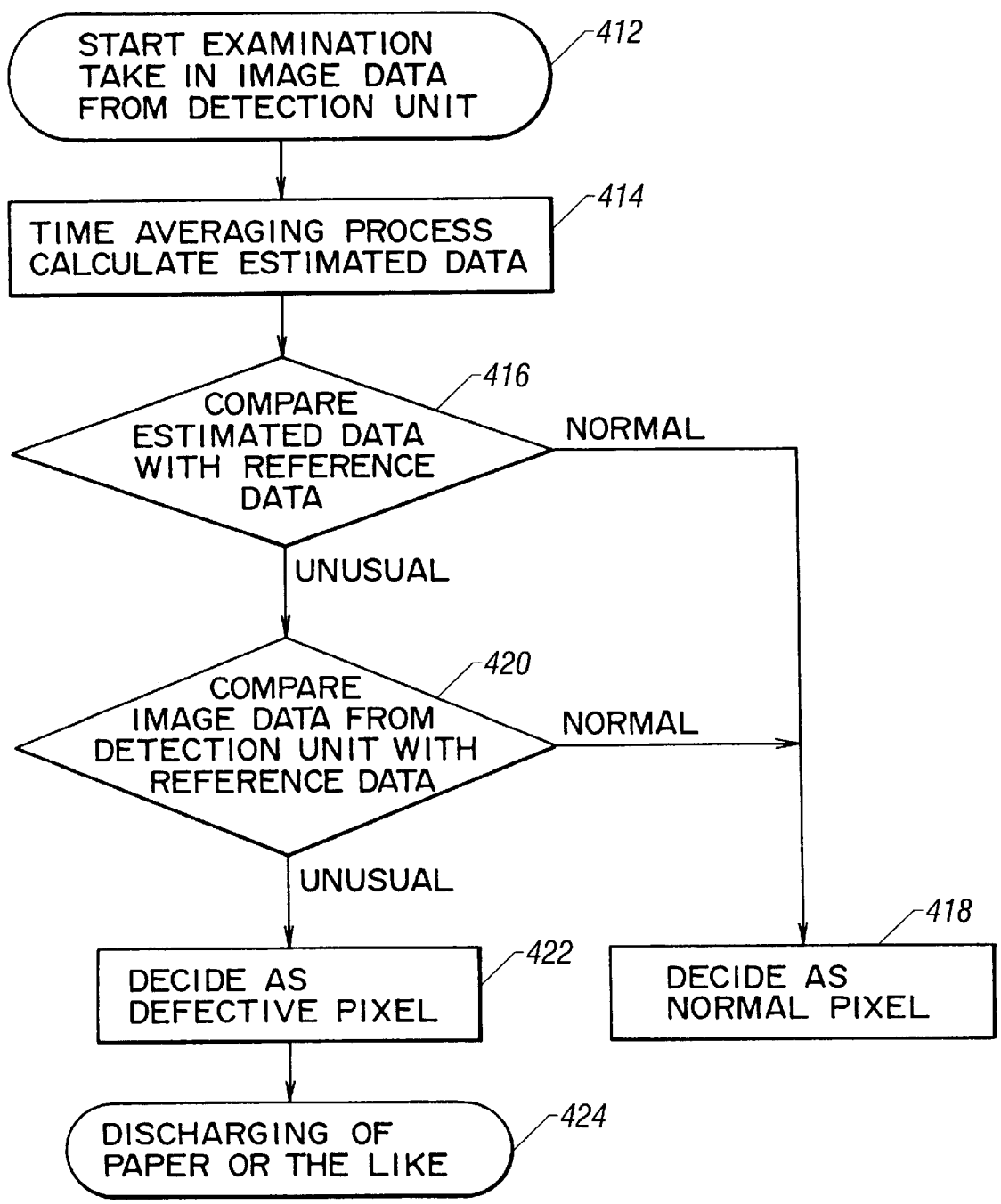
FIG. 2 is a flow chart showing decision operation of the printing quality examining apparatus of the present invention.

FIG. 1 schematically illustrates a portion of the whole configuration of a printing quality examining apparatus according to a first embodiment of the present invention and FIG. 2 is a flow chart showing the printing quality examining method performed by the apparatus.

Before the whole configuration of the printing quality examining apparatus is described, the basic function of the printing quality examining apparatus according to the present invention is first described with reference to the flow chart of the decision operation shown in FIG. 2.

Image data of printing paper are taken in by a camera of a detection unit successively and the successively taken-in image data are averaged in time to calculate an estimated data. Then, the estimated data is compared with a previously taken-in reference data. When the estimated data is normal, pixels are decided to be normal and when the estimated data is unusual, the image data from the detection unit is compared with the reference data at next step. When the image data from the detection unit is normal, the pixels are decided to be normal and when the image data is unusual, the pixels are decided to be defective and the printing paper is discharged.

At first, when a printing condition is stabilized after a lapse of certain time since the printing has been started, the operator makes a decision from the printing paper and reads a reference picture data into the memory.

In this case, the printing material is separated into pixels of 1,000×1,000 and is stored in the memory. Then, an inspection permissible value is calculated for each pixel of the reference picture data, and, based on this inspection permissible value, a decision is made whether the estimated data is normal or not.

A decision of whether the expression (model expression) of the inspection permissible value for each pixel is normal or abnormal is made based on (reference data) ±(inspection permissible value):

$$\epsilon(S_{ij}) = a \times S_{ij} \times b$$

where $\epsilon(S_{ij})$=inspection permissible value, and
$S_{ij}$=data for each pixel of the reference picture.

More specifically, a decision is made that the model expression is abnormal when reference data−estimated>±inspection permissible value, and a decision is made that the model expression is normal when reference data−estimated≦±inspection permissible value.

The flow of the picture data to be read from the printed paper by a camera is as follows. (The reference picture data is stored in the memory by storing the data of a certain page when the printing has been stabilized, as described above.)

1. Picture data of each pixel $V_{ij}(k)$
2. Take an average of this data and the estimated data of one page of each pixel $P_{ij}(k-1)$, and calculate an estimated data $P_{ij}(k)$ of this page.
3. Compare this $P_{ij}(k)$ with the reference data $S_{ij}$, and make a decision based on the result of the comparison. In other words, the data taken in by the camera is not directly compared with the reference data, but the raw data is processed (an average value, that is, an average in time direction) and the processed estimated data is compared with the reference data.

The expression for this processing is as follows:

$$P_{ij}(k) = a \times \{V_{ij}(k) - P_{ij}(k-1)\} + P_{ij}(k-1)$$

where $P_{ij}(k)$=estimated data
$V_{ij}(k)$=camera picture data
$V_{ij}(k-1)$=estimated data of one page before
i=coordinates in x direction
j=coordinates in y direction
k=number of pages in time direction
(k: this page; k−1: one page before; k−2: two pages before, and so on)

Accordingly, the data stored in the memory of the operating circuit are as follows:

1. Pixel data of 1,000 of 1,000 stored before starting the inspection.
2. Estimated data of 1,000 of 1,000 averaged in time direction based on the picture data from the camera.

These two data are compared and the result is collated with the inspection permissible value shown in the previous discussion above.

Figure 7:
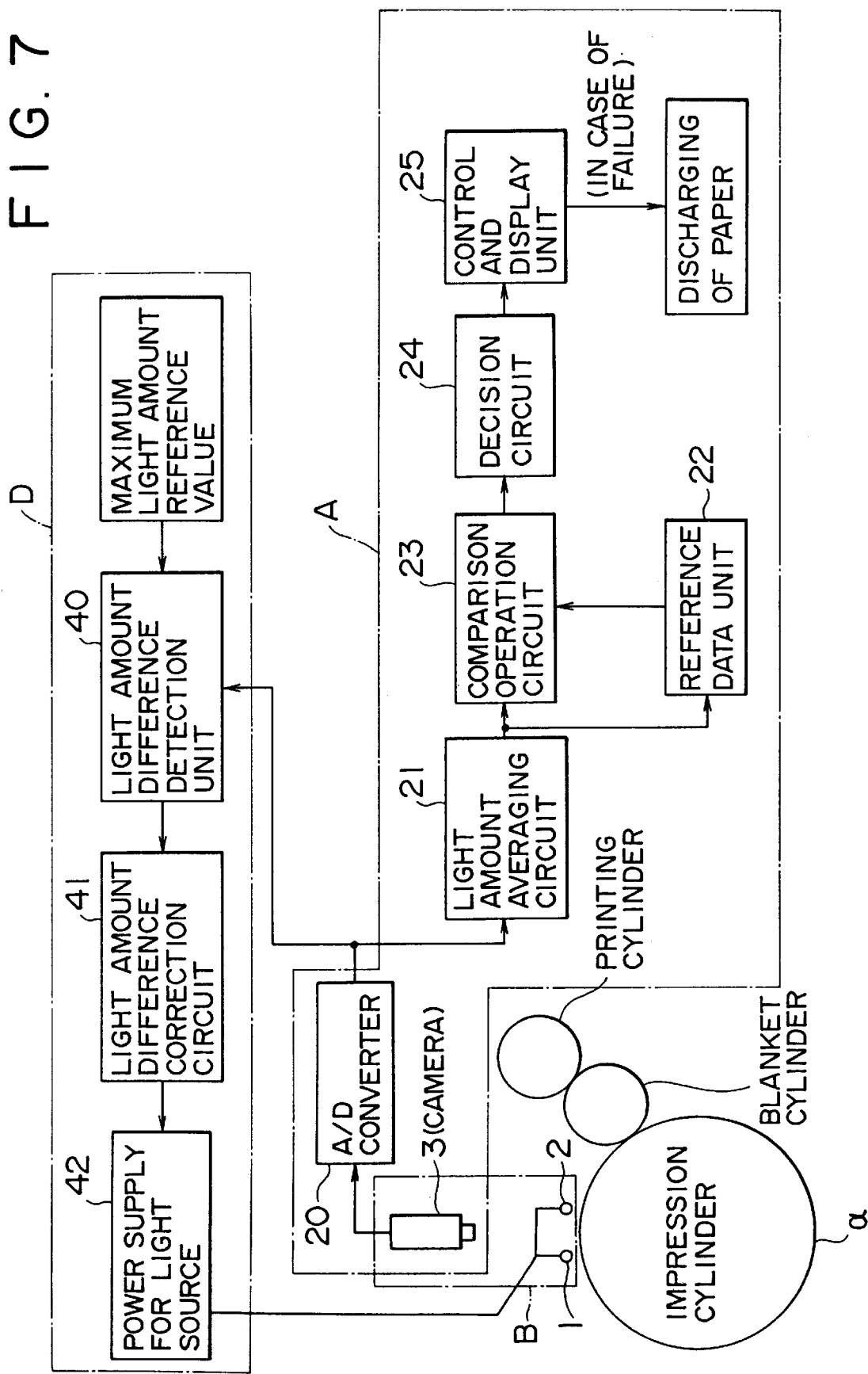
FIG. 7 is a schematic diagram illustrating a printing quality examining apparatus according to a second embodiment of the present invention.

Such an examination shown by the flow chart is performed in a decision circuit 24 of FIG. 1 or 7. That is, an algorithm of the above examination is set in the decision circuit 24.

According to the printing quality examination apparatus of the present invention, the following effects can be attained. That is, since the estimated data is obtained by averaging the image data in time, high stability is obtained, whereas influence of defective image data in the past is inherited. On the other hand, the image data taken in by the detection unit has inferior stability but is not influenced by the defective data in the past. Values having the complementary characteristic are compared with the reference data and decision as to whether the printing quality is good or bad is made so that a defect that some satisfactory papers subsequent to defective paper are decided as defective papers can be eliminated.

In the present system, there are the following three picture data:

1. Data $V_{ij}(k)$ directly read from the camera.
2. $P_{ij}(k)$ which is a result of time averaging with $V_{ij}(k)$.
3. Reference data $S_{ij}$.

The "complementary" data refers to (i) $V_{ij}(k)$ and (ii) $P_{ij}(k)$.

Referring to FIG. 2, a decision about the print quality is made using the picture data $V_{ij}(k)$, as indicated at block 412. The estimated data $P_{ij}(k)$ is the result of time averaging with $V_{ij}(k)$, as shown in block 414. The estimated data $P_{ij}(k)$ is compared with the reference data $S_{ij}$, as indicated in diamond 416. If the comparison is "normal", the pixel is satisfactory (block 418). Thus, if the estimated data is normal, the image data of the printing paper successively taken in by the camera is averaged to calculate an estimated data which is compared with previous taken in reference data. In the case where an estimated data is abnormal, a comparison is made between the picture data and the reference data $S_{ij}$ at diamond 420. If the comparison is "unusual", the pixel is defective (blocks 422, 424).

Thus, there are two decision paths: (1) a flow that a pixel is decided to be normal if an estimated data is normal in comparison of the estimated data and the reference data with each other; and (2) a flow that an estimated data is compared with the reference data in a step; if the estimated data is abnormal in the step, an image data is compared with the reference data in a next step; if an image data is normal in the next step, a decision is made that a pixel is normal; but if the image data is abnormal in the next step, a decision is made that a pixel is defective.

Thus, the term "complementary" refers to an estimated data and an image data associated with each other in a complementary relation or in a relation that both form a complete or better whole together. In a more detailed manner, "complementary" then refers to a complementary relation between an estimated data processed by averaging the raw data thereof taken in by a camera in time, which processed data is used as a comparative object in order to decide on whether a pixel is good or bad, and an image data. The estimated data is data which inherits an influence of a defective image data in the past, while a high stability is attainable. On the other hand, the image data is data which inherits no influence of a defective image data in the past, while a high stability is not attainable.

From this standpoint, in the printing quality examining apparatus in which the image data of printing paper taken in by the camera of the detection unit are compared with the previously taken-in reference data to detect printing defect so that decision as to whether the printing quality is good or bad is made, the image data of printing paper successively taken in by the camera of the detection unit are averaged in time to calculate an estimated data and the estimated data is compared with the previously taken-in reference data. When the estimated data is normal, pixels are decided to be normal and when the estimated data is unusual, the imaged data from the detection unit are compared with the reference data is next step. When the image data from the detection unit is normal, the pixels are decided to be normal and when the image data is unusual, the pixels are decided to be defective and the printing paper is discharged. Accordingly, the defect that some satisfactory papers subsequent to defective paper are decided to be defective can be eliminated.

Referring now to FIGS. 1 to 6, the whole configuration of the printing quality examining apparatus according to the first embodiment of the present invention is described.

As shown in FIG. 1, the printing quality examination apparatus of the embodiment comprises a decision control unit A including a decision circuit 24 which performs the above-mentioned examination algorithm, a detection unit (illumination apparatus) B, and a light amount correction unit C. The illumination apparatus of the printing quality examination apparatus includes illumination light sources 1 and 2 and a camera 3, and the illumination light sources 1 and 2 and the camera 3 constitute the detection unit B.

Figure 3:
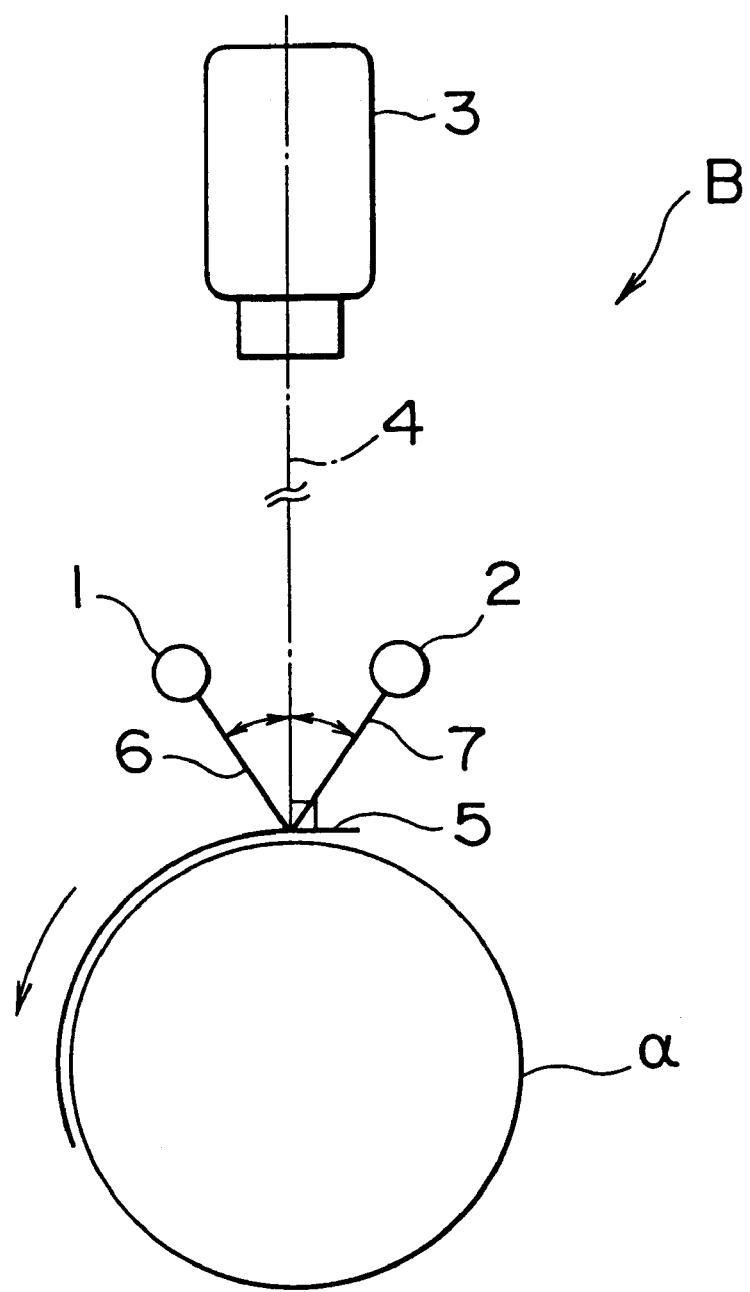
FIG. 3 is a side view showing an embodiment of an illumination device (detection unit) of the printing quality examining apparatus according to the present invention.

In FIG. 3, numeral 4 denotes an optical axis of the camera, 5 a printing paper which is curved acruatedly on an impression cylinder A, 6 an incident axis of the light source 1, and 7 an incident axis of the light source 2. The detection unit B including the illumination light sources 1 and 2 and the camera 3 is disposed in opposite to the printing paper 5 curved arcuatedly on the impression cylinder A.

Further, the illumination light sources 1 and 2 are disposed so that the incident axis 6 of the illumination light source 1 and the incident axis 7 of the illumination light source 2 are symmetrically oblique to the optical axis of the camera 3 and have equal angles with respect to the optical axis of the camera 3.

Figure 4:
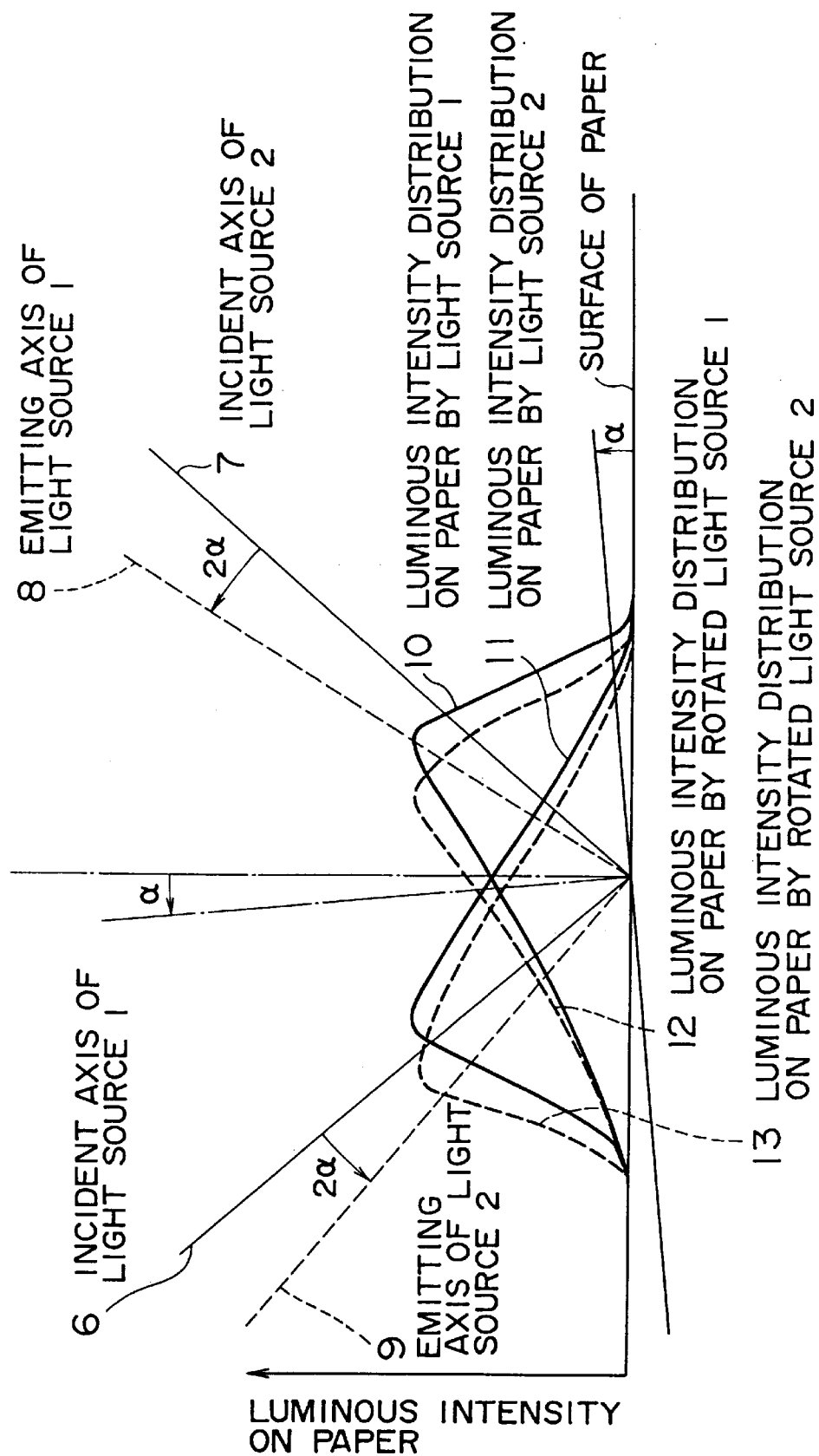
FIG. 4 is a diagram explaining operation of the illumination apparatus shown in FIG. 3.

Operation of the illumination apparatus of the printing quality apparatus shown in FIG. 1 is now described concretely with reference to FIG. 4.

When the printing paper 5 is rotated counterclockwise by α, an emitting 8 of the illumination light source 1 is also rotated in the same direction by 2α. Accordingly, the maximum point of the distribution 12 of luminous intensity on the paper by the rotated illumination light source 1 is moved leftward and an amount of light on the optical axis of the camera is increased as in the prior art. However, the maximum point of the distribution 13 of luminous intensity by the rotated illumination light source 2 is also moved leftward to thereby reduce the light amount on the optical axis of the camera. In this manner, the light amounts of the illumination light sources 1 and 2 are increased and reduced relatively and accordingly the illumination apparatus always produces a fixed light amount with respect to the camera 3 even if the printing paper 5 is varied due to fluttering of the held end.

Numeral 8 denotes an emitting axis of the illumination light source 1, 9 an emitting axis of the illumination light source 2, 10 the distribution of luminous intensity on paper by the illumination light source 1, and 11 the distribution of luminous intensity on paper by the illumination light source 2.

In the illumination apparatus of the printing quality examining apparatus of the present invention, when the printing paper is rotated counterclockwise by α, the emitting axis of one illumination light source is also rotated in the same direction by 2α. Accordingly, the maximum point of the distribution of luminous intensity on paper by one illumination light source is moved leftward and the amount of light on the optical axis of the camera is increased as in the prior art. However, the maximum point of the distribution of luminous intensity by the other illumination light source is also moved leftward to thereby reduce the amount of light on the optical axis of the camera. In this manner, since the light amounts of both the illumination light sources are increased and reduced relatively, the illumination apparatus can produce a fixed amount of light with respect to the camera even if the printing paper is varied due to fluttering of the held and thereof, so that the detection accuracy of defects can be improved remarkably.

Further, an inexpensive fluorescent lamp can be used for the illumination light source. In addition, optical parts such as an optical fiber and the like are not required, so that a manufacturing cost can be reduced and labor necessary for maintenance of optical components can be reduced.

Figure 5:
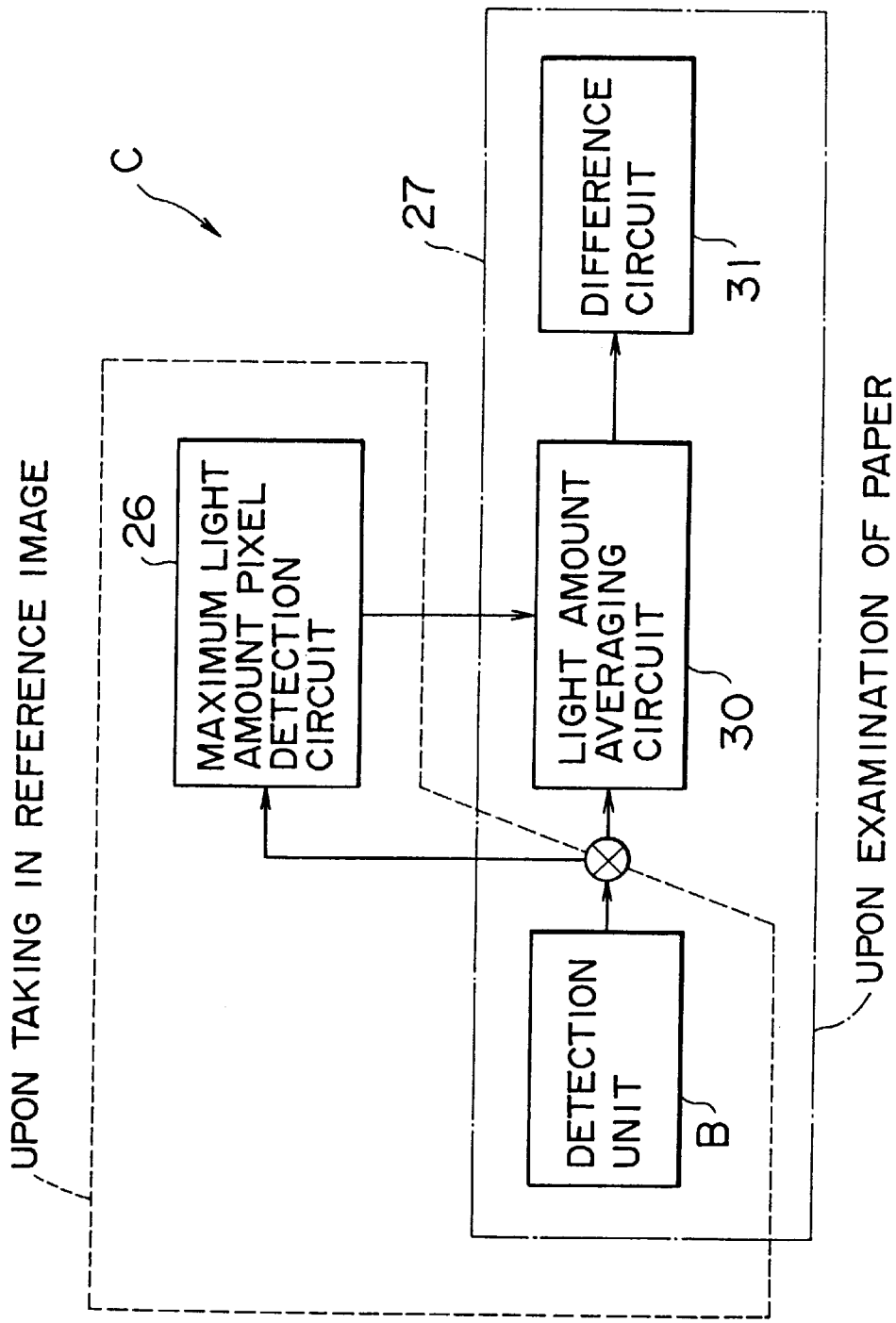
FIG. 5 is a circuit diagram schematically illustrating a light amount correction unit in a first embodiment of the printing quality examining apparatus according to the first embodiment of the present invention.

The decision control unit A is a basic element which performs the printing quality examination shown in FIG. 2 on the basis of the detection signal from the detection unit B and, as shown in FIGS. 1 and 5, includes the detection unit B having a line camera 3 or the like, an analog-to-digital (A/D) converter 20 for converting the image data signal from the detection unit B from an analog value to a digital value, a light amount value averaging circuit 21 for averaging the digitally converted image data from the A/D converter 20, a comparison operation circuit 23 for comparing the averaged image data produced by the circuit 21 with reference image data (data from a reference data unit 22), a decision circuit 24 for deciding whether the printing quality is good or bad on the basis of the comparison result from the comparison operation circuit 23, and a control and display unit 25 for performing control or display on the decision result from the decision circuit 24. There is a direct connection between the A/D converter 20 and the comparison operation circuit 23, as shown in FIG. 1.

Further, the apparatus shown in FIG. 1 includes the light amount correction unit C in relation to the decision control unit A. As shown in FIGS. 1 and 5, the light amount correction unit C includes the detection unit B having the line camera 3 or the like, an A/D converter 20 for converting the image data signal taken in by the line camera 3 of the detection unit B from an analog value to a digital value, a maximum light amount pixel position detection circuit 26 for selecting a plurality of maximum light amount pixels from the digitally converted image data signal from the A/D converter 20 to determine and hold pixel positions thereof, a pixel data detection circuit 27 for detecting pixel data (light amount) in the positions detected by the circuit 26, and a power supply 28 for the light source for supplying electric power based on a control signal from the circuit 27 to the illumination light sources 1 and 2. The pixel data (light amount) detection circuit 27 includes, as shown in FIG. 5, a light amount averaging circuit 31 for circulating an average value (current value) Lw of the maximum light amount pixels produced from the maximum light amount pixel detection circuit 26 and a difference circuit 21 for comparing the average value (current value) Lw with a previously set reference value Lt of the light amount to calculate a difference ΔL. In FIG. 5, the above A/D converter 20 is omitted for simplification of the circuit.

Operation of the printing quality examining apparatus shown in FIG. 5 is now described concretely.

Image data constituting a reference image is taken in by the camera 3 of the detection unit B at the time that the printing state is stable. A plurality of pixels having the maximum brightness are selected from all pixels constituting the image data by the maximum light amount pixel detection circuit 26. Further, pixels of a previously set number are selected from the pixels and are defined as noticeable pixels 35 (refer to FIG. 6). In FIG. 6, numeral 36 denotes printed image data, 37 an area in which the noticeable pixel exists, and 38 peripheral pixels.

When the brightness value of the noticeable pixel 35 is compared with brightness values of a plurality of pixels existing in the vicinity of the noticeable pixel (hereinafter referred to as peripheral pixels) and when differences thereof fall in a predetermined set threshold, the noticeable pixel 35 is defined to be the maximum light amount pixel. However, when the differences of the brightness values do not fall in the threshold, the noticeable pixel 35 is regarded as data containing influence such as noise and is not defined to be the maximum light amount pixel. The position of the maximum light amount pixel thus determined is held.

In the examination of the printing paper, pixel data are successively taken in by the camera 3 of the detection unit B and pixels corresponding to positions of the above maximum light amount pixels are selected from the pixel data. An average value Lw of brightness is calculated from the maximum light amount pixels by the light amount averaging circuit 30 and the average value Lw of brightness is supplied to the difference circuit 31 as a current light amount. In the difference circuit, the average value Lw of brightness is compared with a previously set light amount reference value (target value of light amount) Lt to calculate a difference ΔL (that is, Lt−Lw). A voltage variation ΔV is calculated while using the difference ΔL as a parameter and the power supply 28 for the light source is controlled by the voltage variation ΔV to thereby correct the light amount of the illumination light sources 1 and 2 so that the optimum illumination condition is obtained by the detection unit B.

The reference data is usually taken in the reference data unit 22 only upon taking in of the reference data except the examination time.

In the light amount correction unit C provided in the printing quality examining apparatus of the present invention, when the printing paper is illuminated by the illumination light source and the image data of the printing paper is taken in by the camera of the detection unit to decide whether the printing quality is good or bad on the basis of the image data, a plurality of maximum light amount pixels are selected from the taken-in image data by the maximum light amount pixel detection circuit and positions of these pixels are determined and held. An average value of the maximum light amount pixels is calculated by the light amount averaging circuit and is compared with the previously set light amount reference value to calculate a difference thereof by the difference circuit. The voltage variation is calculated while using the difference as a parameter and the light amount of the illumination light source is corrected by the voltage variation to obtain the optimum illumination condition by the detection unit. Accordingly, the correction of the light amount can be made for the printing paper having no blank portion.

Further, the light amount of a printed portion except the blank portion is not read and the corrected light amount in the detection unit can be stabilized.

Furthermore, in the examination of the printing quality, since the blank portion of the printing paper can be eliminated, a cost of printing paper can be reduced when the printing paper is expensive.

Figure 8:
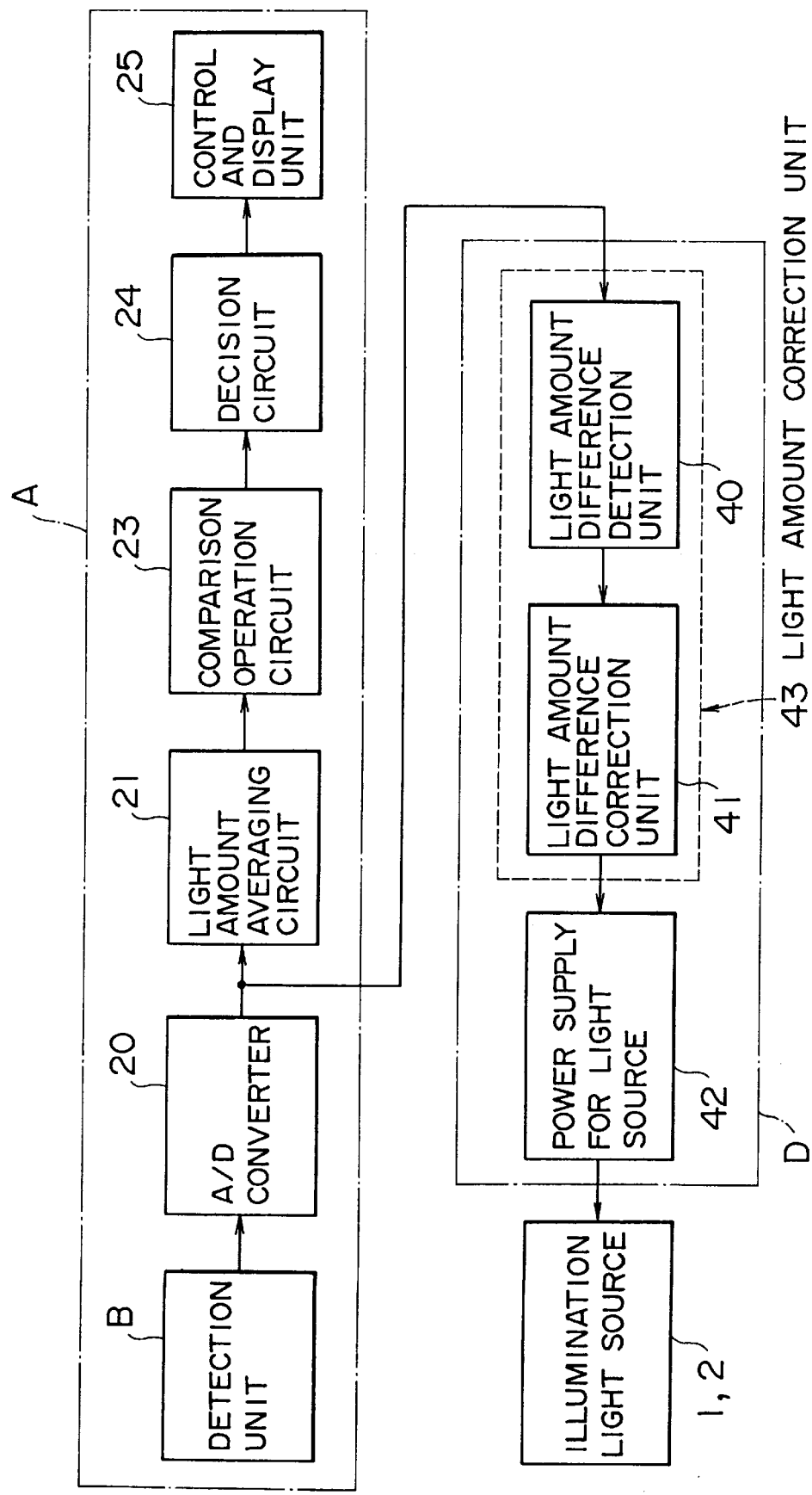
FIG. 8 is a schematic diagram illustrating a portion of the printing quality examining apparatus shown in FIG. 7.
Figure 9:
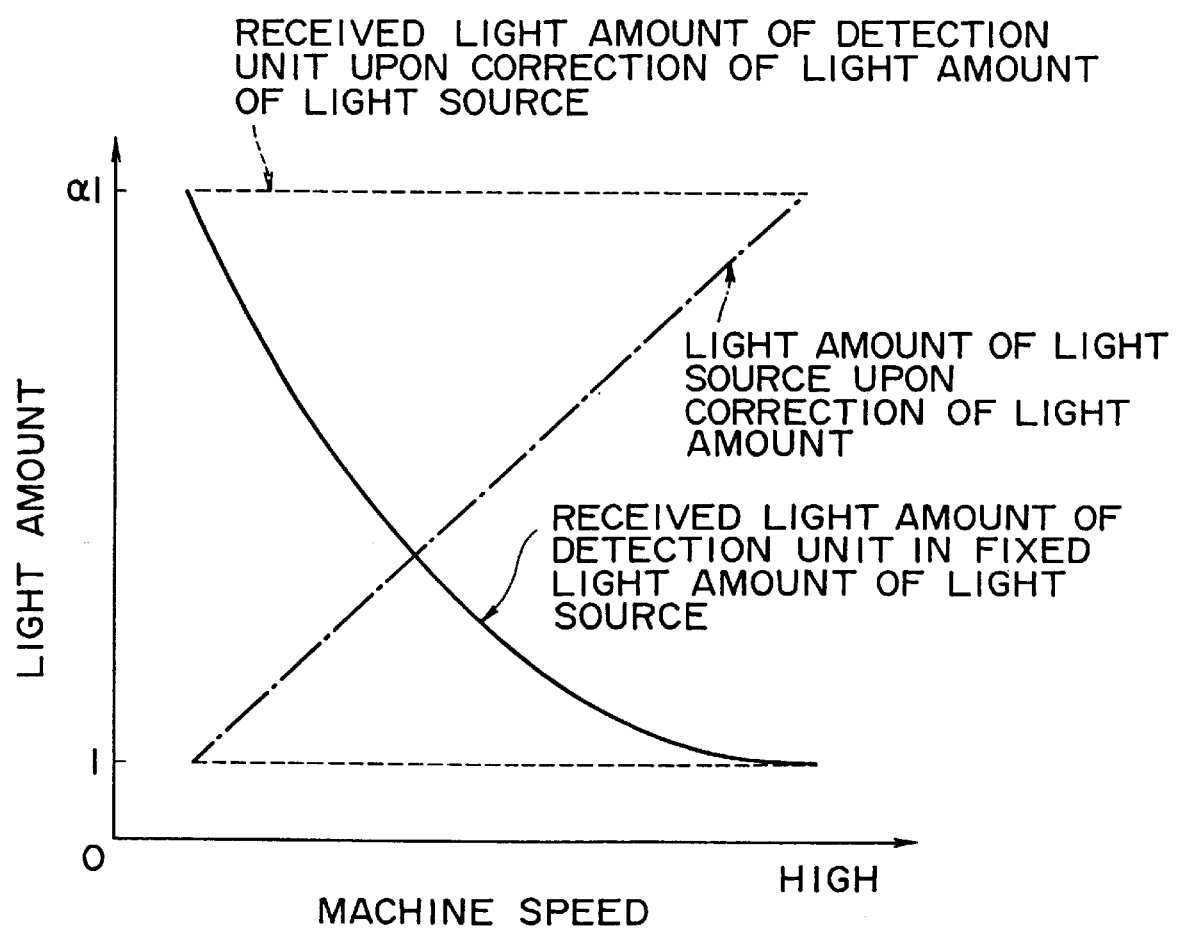
FIG. 9 is a diagram showing a relation of an amount of illumination light and a luminous intensity on paper in the printing quality examining apparatus shown in FIG. 7.
Figure 10:
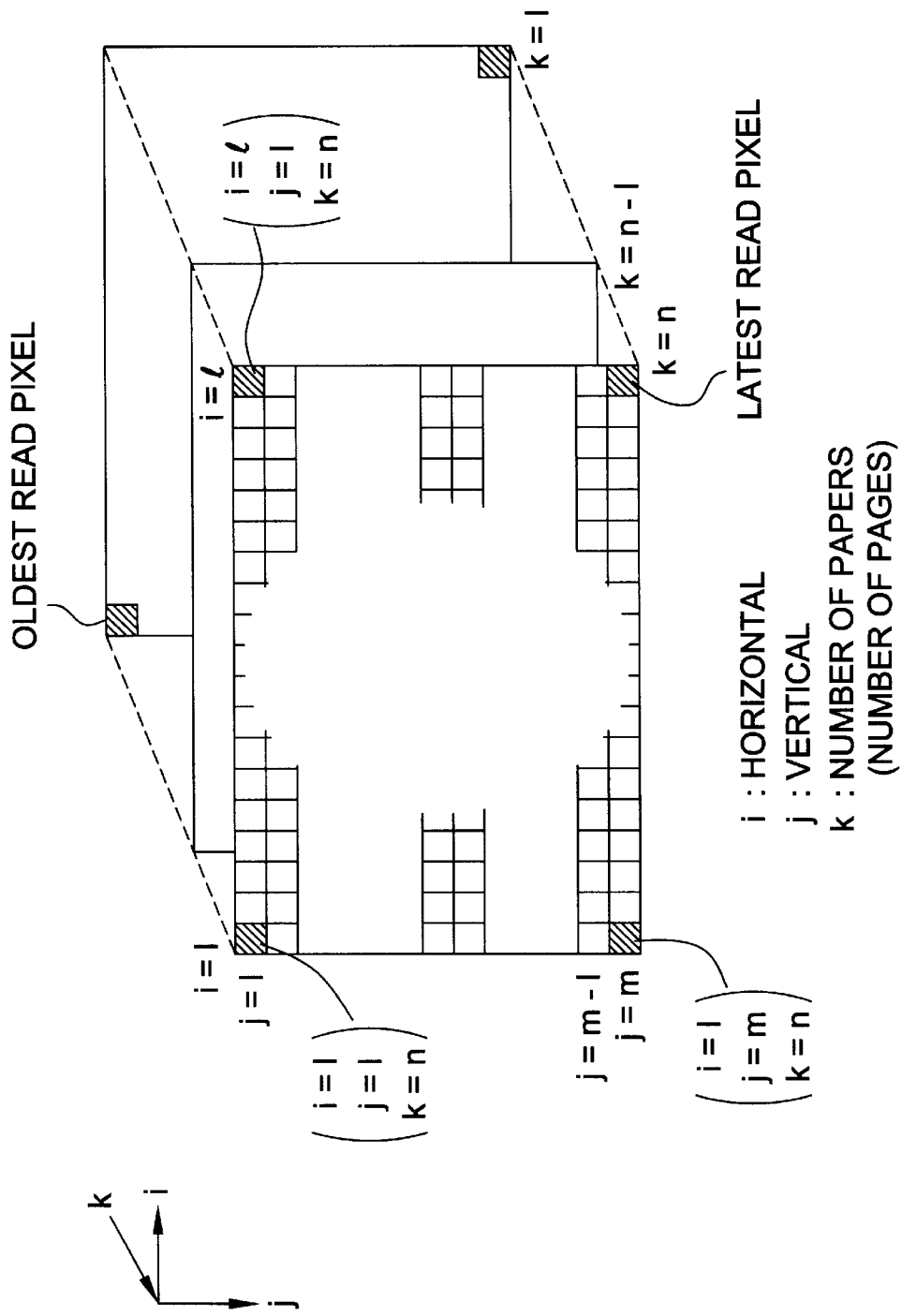
FIG. 10 is a diagram illustrating a conventional printing quality examining method.
Figure 11:
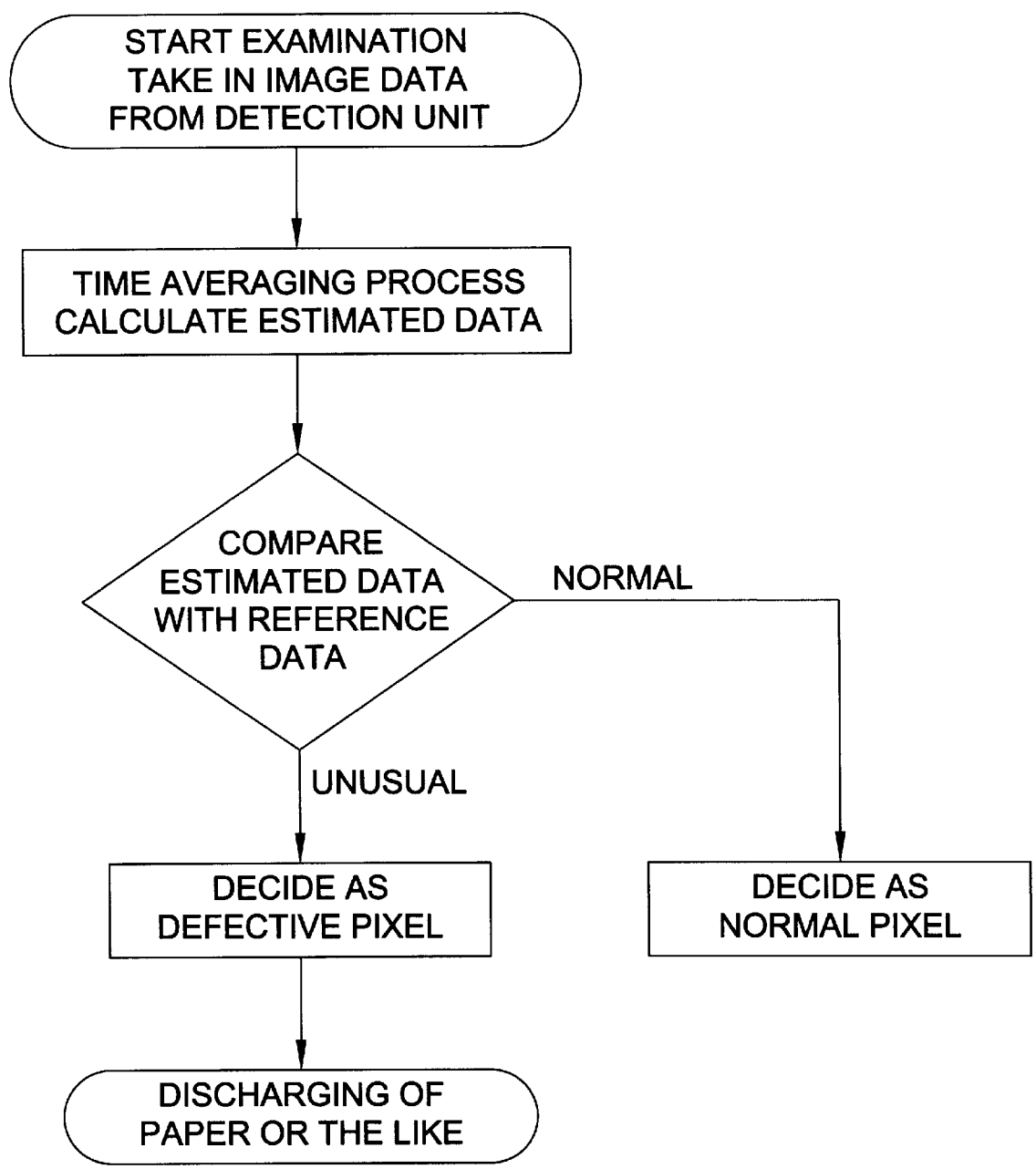
FIG. 11 is a flow chart showing decision operation of the printing quality examining method shown in FIG. 10.
Figure 12:
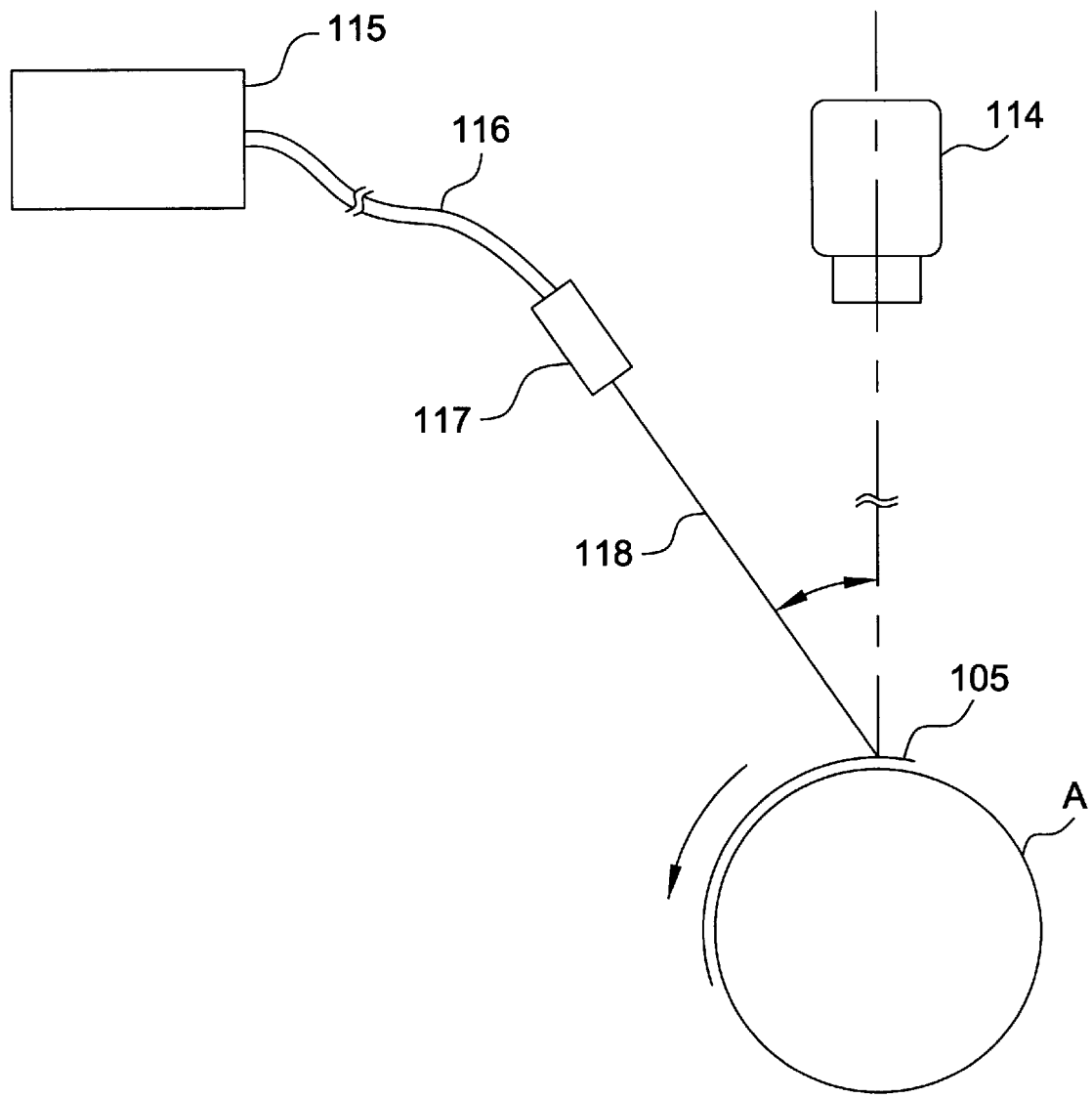
FIG. 12 is a side view illustrating an illumination apparatus of the conventional printing quality examining apparatus.
Figure 13:
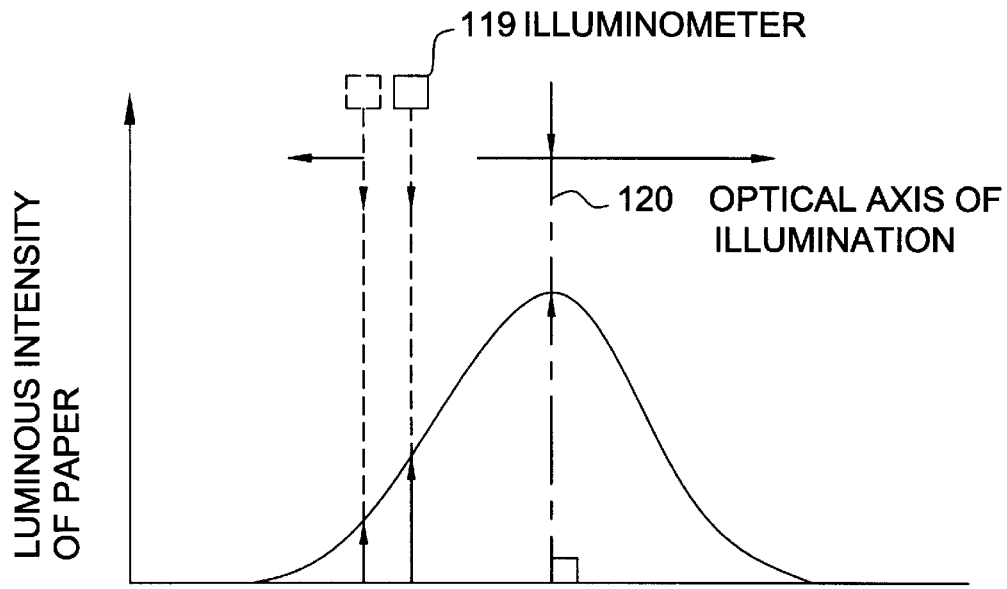
FIG. 13 is a diagram illustrating a distribution of luminous intensity of the illumination apparatus shown in FIG. 12.
Figure 14:
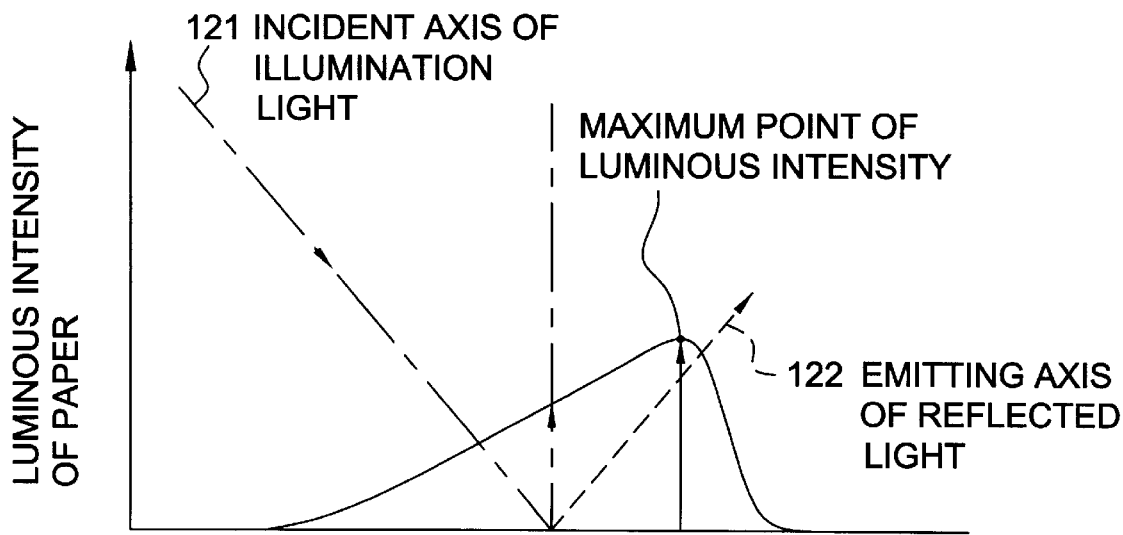
FIG. 14 is a diagram illustrating a distribution of luminous intensity on paper of the illumination apparatus shown in FIG. 12.
Figure 15:
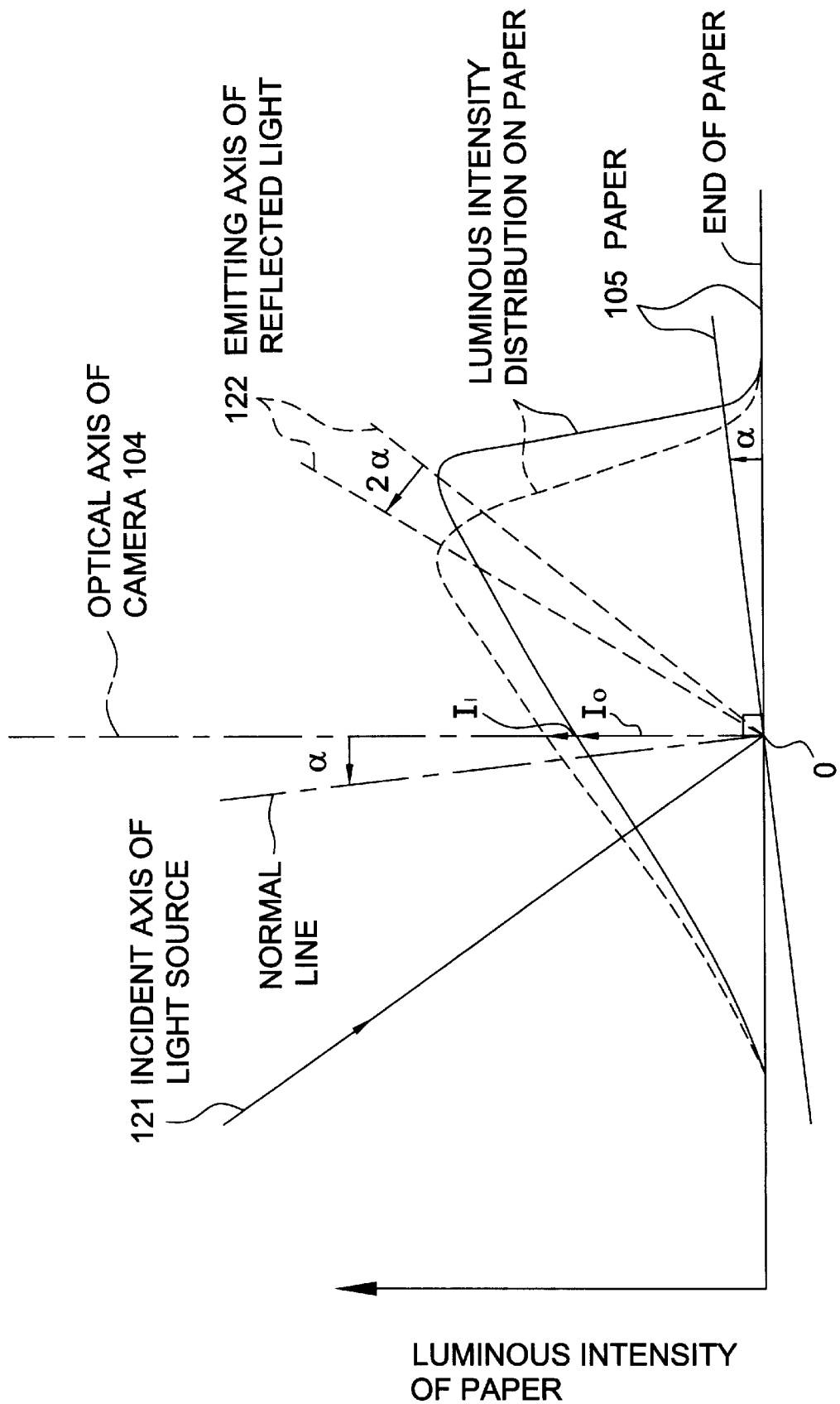
FIG. 15 is a diagram illustrating operation of the illumination apparatus shown in FIG. 12.

FIGS. 7 to 9 illustrate a second embodiment of the present invention. The embodiment includes a light amount correction unit D shown in FIGS. 7 and 8 instead of the above-mentioned light amount correction unit C and is applicable to the case where the printing paper has a blank portion. In FIGS. 7 and 8, the same portions as those of FIG. 1 are designated by the same reference numerals and description thereof is omitted.

As shown in FIG. 7, the printing quality examination apparatus of the embodiment includes the light amount correction unit D in relation to the decision control unit A as described above. The light amount correction unit D includes, as shown in FIGS. 7 and 8, a light amount difference detection unit 40 for comparing the digitally converted image data (image data of blank portion) from the A/D converter 20 with the previously set target luminous intensity value (maximum light amount reference value), a light amount difference correction circuit 41 for calculating a correction value for a difference of the luminous intensity values from the light amount difference detection unit 40, and a power supply 42 for light sources. As shown in FIG. 8, the light amount difference detection unit 40 and the light amount difference correction circuit 41 constitute a light amount correction unit 43. Electric power is supplied from the power supply for light sources having a voltage which is varied to the illumination light sources 1 and 2 by the light amount correction unit 43.

Operation of circuit of the printing quality examining apparatus shown in FIG. 7 is now described concretely.

A blank portion on the printing paper is read by the line camera of the detection unit B and the image data of the blank portion is supplied to the A/D converter 20 to be converted to a digital value. The digitally converted image data Lw of the blank portion is supplied to the light amount difference detection unit 40 of the light amount correction unit 43 and is compared with the previously set target luminous intensity value (maximum light amount reference value) Lt to obtain a difference of light amount ΔL (Lt−Lw).

A correction voltage ΔV for correcting a voltage value of the power supply 42 for light sources is obtained by the light amount difference correction circuit 41 while using the light amount difference ΔL (Lt−Lw) as a parameter and the power supply 42 for light sources is controlled to change the luminous intensity of the illumination light sources 1 and 2 so that a signal having a fixed level is always obtained from the detection unit B without relation to the machine speed. In other words, as shown in FIG. 9, when the machine speed is increased and the received light amount of the detection unit B is reduced, the illumination light sources 1 and 2 are controlled to increase the illumination light amount of the reduced amount so that the received light amount from the blank portion of the detection unit B is always maintained to be constant.

Figure 16:
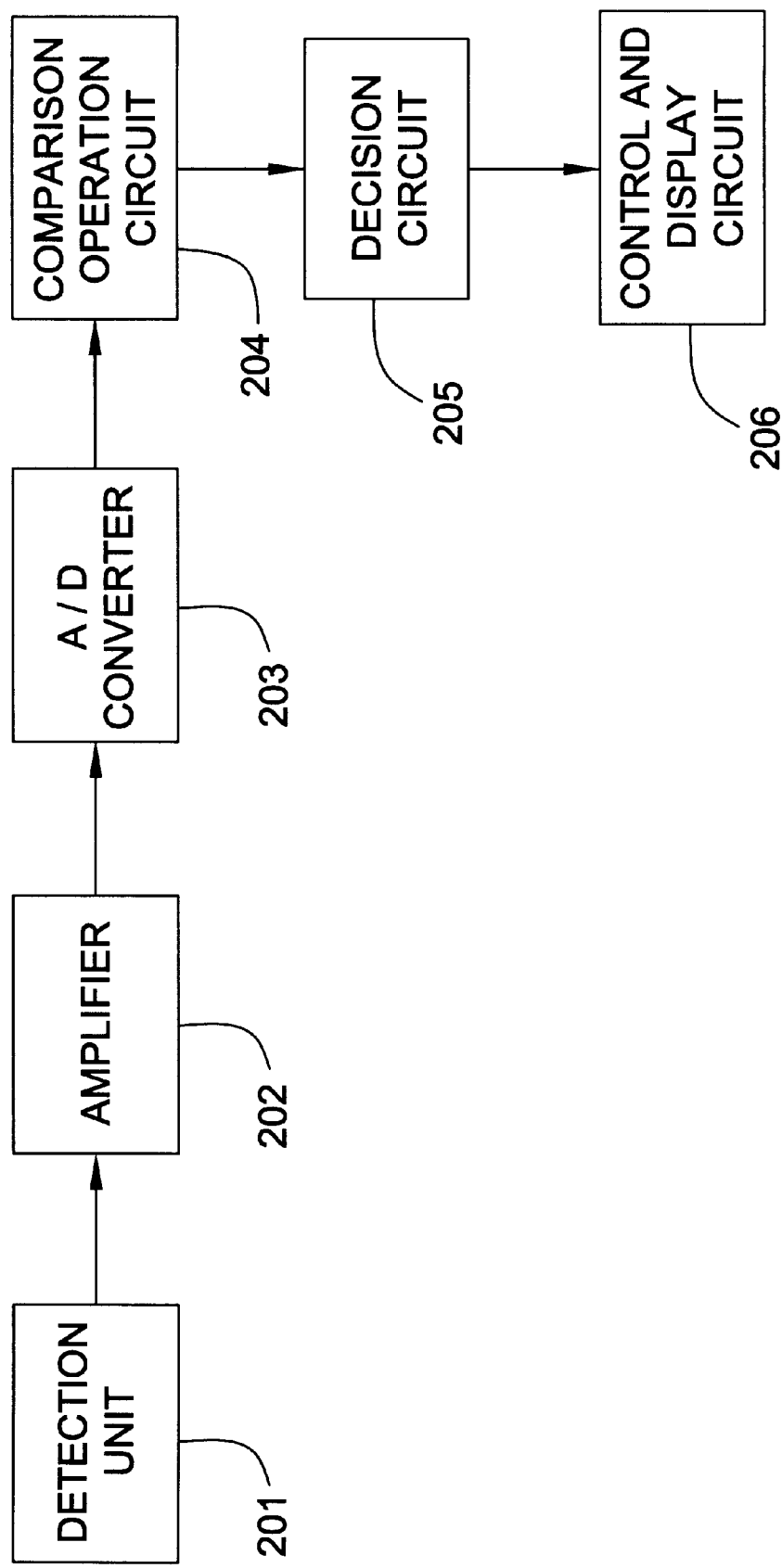
FIG. 16 is a schematic diagram illustrating a conventional printing quality examining apparatus.
Figure 17:
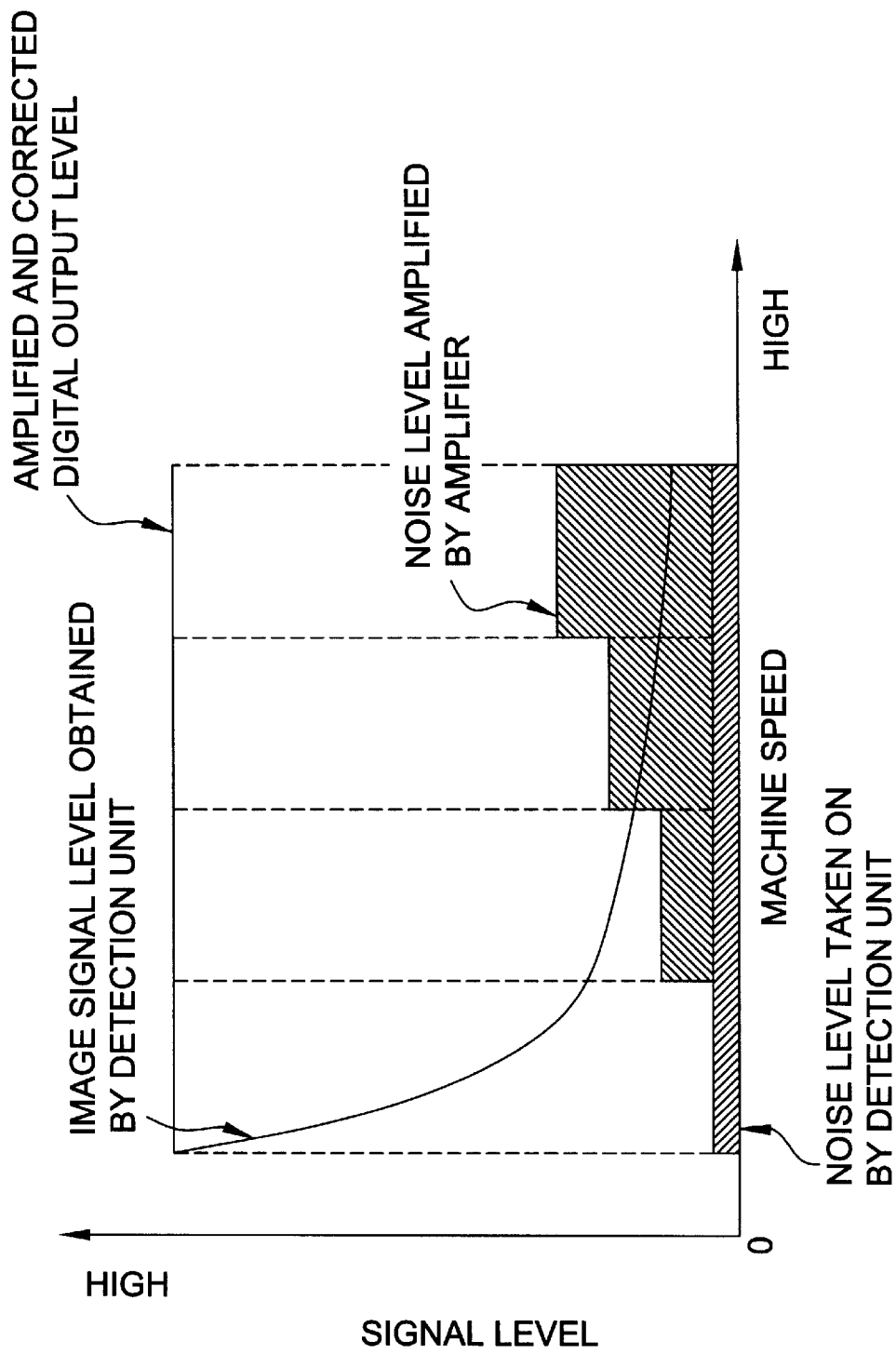
FIG. 17 is a diagram showing a relation of the machine speed, a corrected output signal and a noise level of the printing quality examining apparatus shown in FIG. 16.
Figure 18:
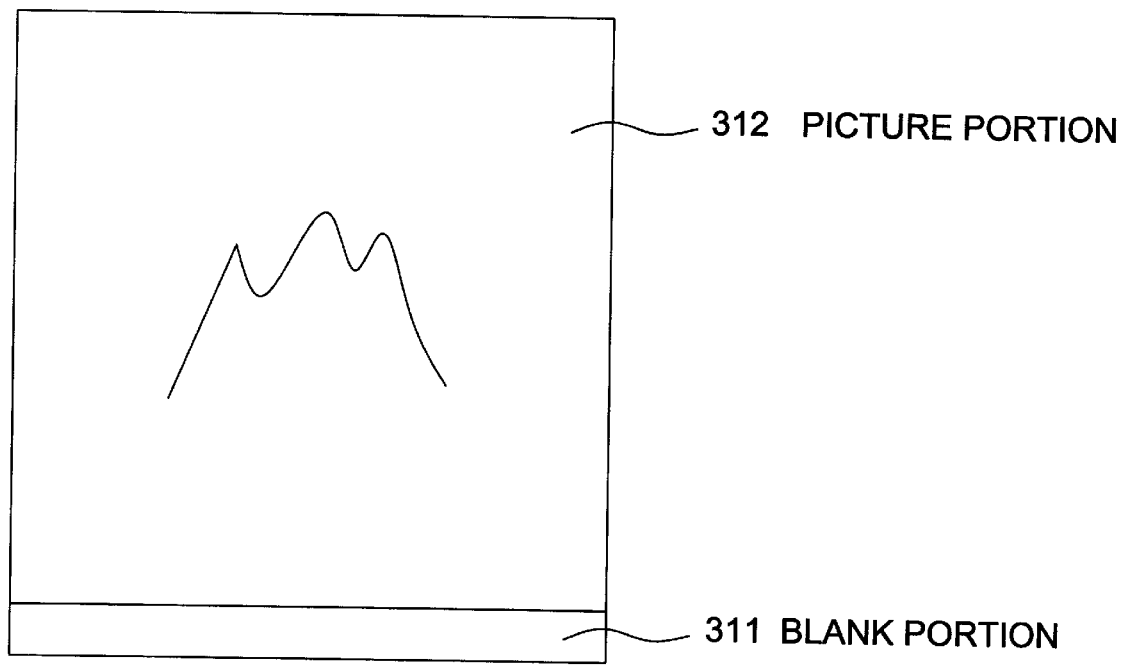
FIG. 18 is a plan view showing printing paper upon examination of the printing quality in a prior art.

According to the light amount correction unit D of the printing quality detection apparatus, the blank portion of the printing paper is read by the line camera of the detection unit B as described above and the image data of the blank portion is supplied to the light amount correction unit in which the image data of the blank portion is compared with the previously set target luminous intensity to obtain the light amount difference. The correction voltage for correcting the voltage value of the power supply for light sources is obtained while using the light amount difference as a parameter. The power supply for light sources is controlled by the correction voltage to change the luminous intensity of the illumination light source so that the signal having a fixed level is always obtained from the detection unit without relation to the machine speed. In other words, when the machine speed is increased and the received light amount of the detection unit is reduced, the illumination light source is controlled to increase the illumination light amount by the reduced amount so that the received light amount from the blank portion of the detection unit is always maintained to be constant. Accordingly, the amplifier 202 shown in FIG. 16 can be eliminated and the problem that noise component produced in the amplifier 202 is amplified can be solved, so that the S/N (signal-to-noise) ratio of the signal can be improved remarkably to thereby improve the defect detection performance of the printing paper greatly.

Further, to always maintain the received light amount from the blank portion of the detection unit B constant is to always obtain the optimum received light amount by the detection unit B even for the printing quality having different reflectivity or brightness and even for variation of the machine speed, so that defect of the printing paper can be detected with high stability.

What is claimed is:

1. A printing quality examining method in which image data of printing paper successively taken in by a camera of a detection unit are compared with a previously taken-in reference data to detect a printing defect so that a decision as to whether printing quality is good or bad is made, comprising averaging the image data of the printing paper successively taken in by the camera of the detection unit in time to calculate an estimated data and comparing the estimated data with the previously taken-in reference data so that when the estimated data is normal, pixels are determined to be normal and when the estimated data is unusual, the image data from the detection unit is compared with the reference data at next step so that when the image data from the detection is normal, the pixels are determined to be normal and when the image data is unusual, the pixels are determined to be defective and the paper is discharged.

2. A printing quality examining method according to claim 1, wherein the detection unit including two illumination light sources and the camera is disposed in opposite to the printing paper curved arcuatedly and said two illumination light sources are disposed so that respective optical axes of said two illumination light sources are symmetrically oblique to an optical axis of the camera and have equal angles with respect to the optical axis of the camera, defective paper being detected from the image data of the printing paper taken in by the detection unit.

* * * * *